United States Patent
Gullen

(10) Patent No.: US 10,970,087 B2
(45) Date of Patent: Apr. 6, 2021

(54) WINDOWS CONTENT TRANSFER METHODS AND SYSTEMS

(71) Applicant: Scirra Ltd., London (GB)

(72) Inventor: Ashley Gullen, London (GB)

(73) Assignee: Scirra Ltd., London (GB)

(*) Notice: Subject to any disclaimer, the term of this patent is extended or adjusted under 35 U.S.C. 154(b) by 129 days.

(21) Appl. No.: 15/461,636

(22) Filed: Mar. 17, 2017

(65) Prior Publication Data

US 2018/0217849 A1 Aug. 2, 2018

(30) Foreign Application Priority Data

Jan. 27, 2017 (GB) .................................... 1701394

(51) Int. Cl.
*G06F 9/44* (2018.01)
*G06F 9/451* (2018.01)
*G06F 3/0484* (2013.01)
*G06F 3/0486* (2013.01)

(52) U.S. Cl.
CPC ............ *G06F 9/451* (2018.02); *G06F 3/0486* (2013.01); *G06F 3/04842* (2013.01); *G06F 2203/04803* (2013.01)

(58) Field of Classification Search
CPC .... G06F 9/451; G06F 3/04842; G06F 3/0486; G06F 2203/04803
See application file for complete search history.

(56) References Cited

U.S. PATENT DOCUMENTS

| | | | |
|---|---|---|---|
| 2009/0327947 A1* | 12/2009 | Schreiner | G06F 3/0483 715/777 |
| 2014/0129924 A1* | 5/2014 | Le Bescond de Coatpont | G06F 17/248 715/234 |
| 2015/0213148 A1* | 7/2015 | Blemaster | G06F 3/04842 715/760 |
| 2015/0309971 A1* | 10/2015 | Cowley | G06F 9/44526 715/234 |
| 2017/0003995 A1* | 1/2017 | Hu | G06F 9/45558 |

FOREIGN PATENT DOCUMENTS

| | | |
|---|---|---|
| CN | 105242821 A | 1/2016 |
| WO | 03005184 A2 | 1/2003 |

OTHER PUBLICATIONS

Mar. 27, 2018—(EP) Extended Search Report—App 18153763.0. "How to Position a p:dialog Outside of the Browser or iframe Window," Retrieved Online Mar. 15, 2018.

* cited by examiner

*Primary Examiner* — Seth A Silverman
(74) *Attorney, Agent, or Firm* — Banner & Witcoff, Ltd.

(57) ABSTRACT

A window content transfer method in a graphical user interface is provided. The method comprises: a) receiving a command to transfer the content of a web window, which is displayed within a first native browser window of a browser application, to a second native browser window; b) generating, using the browser application, a second native browser window; and c) transferring, using the browser application, the content of the web window to the second native browser window.

20 Claims, 10 Drawing Sheets

WINDOWS CONTENT TRANSFER METHODS AND SYSTEMS

CROSS-REFERENCE TO RELATED CASES

This application claims priority to United Kingdom application 1701394.7, filed Jan. 27, 2017, having the title "A Window Content Transfer Method," herein incorporated by reference.

FIELD

Aspects described herein relate to methods and systems for window content transfer in a graphical user interface. In particular, some aspects relate to transferring the content of a window between a web window and a native browser on a data processing device.

BACKGROUND

Most graphical operating systems, such as MICROSOFT WINDOWS, feature a windowing system. In these windowing systems, each application running on the operating system occupies a certain area of the display screen, usually accompanied by a border, a caption, a close button, and other such standard surroundings.

A World Wide Web browser (hereinafter a "web browser"), such as Internet EXPLORER, is a typical example of an application which is run and displayed in such a window by the operating system. The applications running these web browser windows have greatly increased in sophistication and many web browsers now provide for "tabbed browsing" in which two or more web browser windows may be displayed within a common frame on the display. This allows a user to switch between the web browser windows by selecting a "tab" representing the content displayed on the window. Further functionality of these web browsers allow a user to separate one or more of the web browser windows from the tabbed arrangement of the other web browser windows to allow viewing of multiple web browser windows at once.

It is advantageous for the applications running these web browser windows to themselves implement a windowing system, which may have similar features to the application, in order to provide additional functionality. Therefore a web browser window may itself display one or more windows displaying content and are usually also accompanied by a border, a caption, a close button, and other such standard surroundings.

The sophistication of the web applications is increasing, and lately web applications have come close to matching the capabilities of native applications in many ways. However, the content of a web window is constrained to remain within the native browser window it is being displayed in. Whilst certain web browser applications contain application programming interfaces (APIs) which allow the creation of new native browser windows, they are highly constrained by popup blockers in order to avoid nuisance use. So, for example, it is not possible for a web page running in a native browser window to create a new native browser window upon start-up. It is therefore not possible to treat web windows in the same manner as native browser windows, nor freely transfer content between them.

SUMMARY

By way of introduction and without limitation, a first aspect described herein provides a window content transfer method in a graphical user interface comprising: receiving a command to transfer the content of a web window, which is displayed within a first native browser window of a browser application, to a second native browser window; generating, using the browser application, a second native browser window; and transferring, using the browser application, the content of the web window to the second native browser window.

Other aspects described herein include systems, apparatus, data processing devices, and/or computer readable media configured to provide window content transfers as described herein. Further features of the invention are defined in the appended dependent claims.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 6b is a DOM tree representation of the native browser window of FIG. 6a;

FIG. 7b shows DOM tree representations of the native browser windows of FIG. 7a;

DETAILED DESCRIPTION

Figure 1:
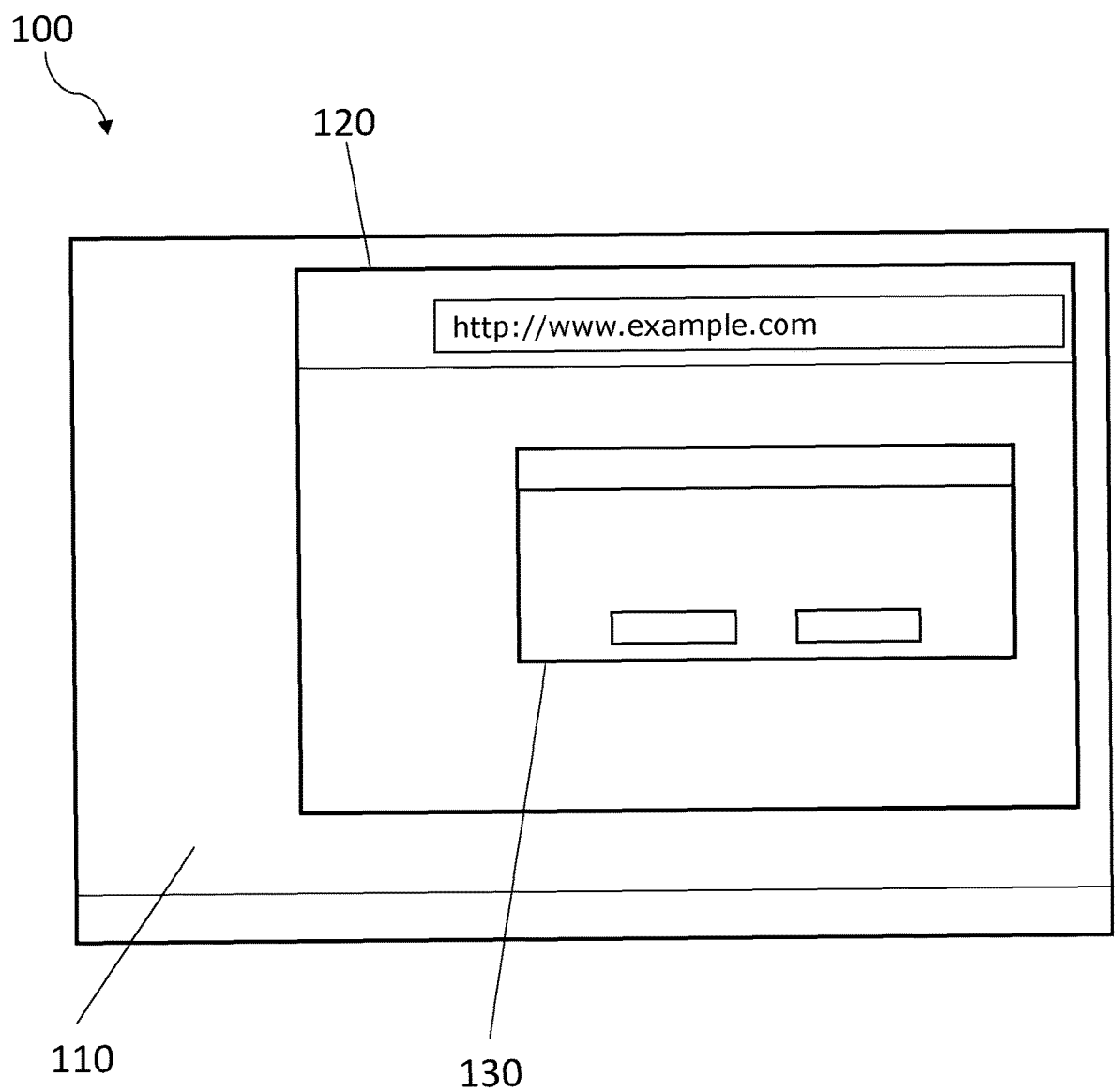
FIG. 1 is a representation of a computer display in accordance with one or more illustrative aspects described herein.

FIG. 1 is a representation of a computer display 100 displaying a graphical user interface of an operating system 110 such as MICROSOFT WINDOWS 7. The particular operating system is not important to the implementation of the invention; however, the operating system does require a windowing system.

Within the computer display 100, an operating system 110 displays a native browser window 120. In this example, the native browser window 120 is a native browser window being run by an application suitable for browsing the World Wide Web. Suitable applications capable of providing native browser windows 120 are well known, and include MICROSOFT INTERNET EXPLORER and GOOGLE CHROME.

It is not intended to describe the detail of how the native browser window 120 may be coded, implemented and run on an operating system, as this is well known in the field of computer operating systems. Such windowing systems enable applications running on the operating system 110 to display windows with at least some of the following functionality:

- Variable styling and layout of both native browser windows and content areas within native browser windows;
- Borders, captions and close buttons within or surrounding native browser windows;
- Ability to resize and reposition native browser windows;
- Layering (determining the order of native browser windows and which is on top)
- Focus (determining which native browser window is active);
- Redirecting some inputs received by the computer on which the operating system is running. I.e. keyboard shortcuts to change the focused native browser window;
- Opening new native browser windows and closing old ones;
- Dialog system for prompting a user for information and allowing the user to provide information;
- "Docking" layout (i.e. positioning a native browser window within the display so that it is locked to one side of another native browser window).

Within the native browser window 120, a web window 130 may be displayed. To distinguish between windows run by the operating system and windows run within browser applications running on the operating system, the terms "native browser window" and "web window" may be used herein, respectively.

The web window 130 is implemented in accordance with instructions provided along with any content displayed in the native browser window. The web window 130 may have similar functionality to that of the native browser window, depending on the capabilities of the application running the native browser window 120.

There are therefore two windowing systems: 1) the "native browser window" system providing native browser windows running on the operating system 110, and 2) the "web window" system providing web windows within a native browser window.

When content is being displayed in a web window, it is the web page being viewed in the native browser window that implements and displays the surrounding window user interface features such as the border and caption. On the other hand, when content is being displayed in a native window, it is the operating system that implements and displays the surrounding window user interface features. According to aspects described herein, only the content is transferred between web windows and native browser windows.

A web window 130 may have many of the functionalities of a native browser window 120, some of which are set out above. However, as the web window 130 is run by the web page being viewed, the web window 130 is restricted to being displayed within the confines of the native browser window 120. Therefore, there exists a need for a method to enable web windows to operate outside of the confines of their native browser window.

Figure 2:
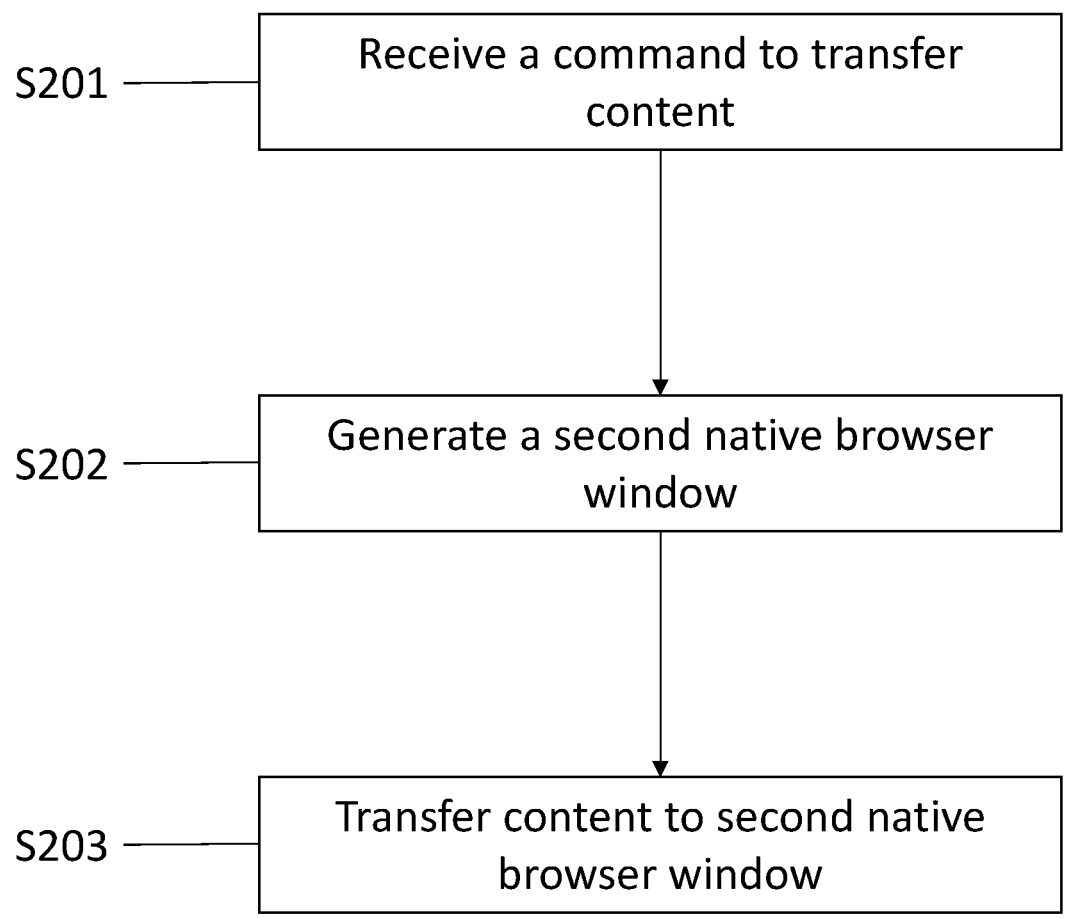
FIG. 2 is a flowchart of a window transfer method in accordance with one or more illustrative aspects described herein.

FIG. 2 illustrates an illustrative method for transferring the content of a web window to a native browser window. At step S201, a user issues a command to transfer a web window to a native browser window. This command may take many different forms, including for example:

- The user moving an edge of the web window outside of the native browser window;
- The user using a menu in the web window caption to select an option such as "Open in popup window";
- The user using a special button in the window caption;
- The user using a dedicated keyboard shortcut.

In response to receiving the command, at step S202, the application running the native browser window, opens a new native browser window outside of the original native browser window. This is possible using browser application programming interfaces (APIs) designed for the purpose (e.g., window.open( ) in Javascript). This should be done at an appropriate time to avoid popup blockers preventing the new native browser window from opening. For example if the command was the user dragging an edge of the web window outside of the native browser window through manipulating a mouse, then the event opening the new native browser window is triggered when the mouse button is released.

The new native browser window that opens is a new instance of a native browser window, and is run by the same application which is running the original native browser window. The application may allow the new native browser window to be customised so that is appears without the usual user interface, such as tabs, toolbars, menus or address bar. This means the new native browser window may be customised to appear like any suitable window, such as the original web window. The new native browser window may also be customised to match the same size as the web window, appear at the same position on screen as the web window, and use the same caption in the native browser window as the web window had.

At step, S203, the application transfers the content of the web window to the new native browser window. To the user, this has the appearance of the web window becoming a new native browser window, which may then be interacted with, the new native browser window having the full functionality of a native browser window. If the new native browser window maintains the aesthetics of the web window, the user may not notice a transfer has occurred, except for the ability to interact with the new native browser window outside of the original native browser window.

Optionally, after step S203, the application may close the web window. Closing the web window avoids duplication of content which may lead to confusion on the part of the user.

Figure 3:
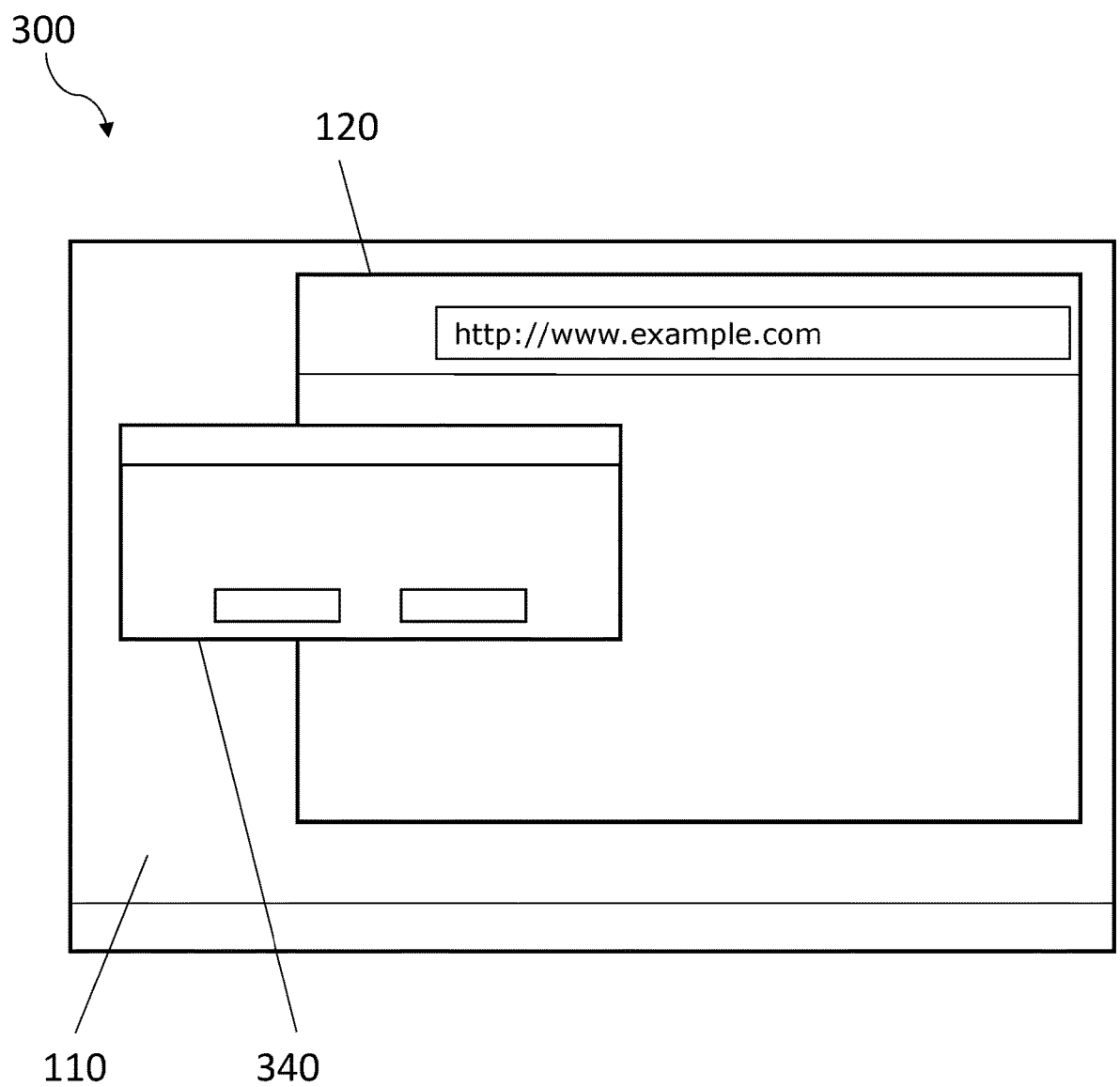
FIG. 3 is a representation of a computer display in accordance with one or more illustrative aspects described herein.

FIG. 3 illustrates how the representation of FIG. 1 may appear to a user once the method set out above has been completed. In FIG. 3, within the computer display 300 running on the operating system 110, a first native browser window 120 and a second native browser window 340 are displayed. The first native browser window 120 corresponds to the native browser window 120 shown in FIG. 1. The second native browser window 340 corresponds to the web window 130 shown in FIG. 1, which has now been transformed into a second native browser window, with equivalent user interface properties. Therefore, to the user, the second native browser window 340 appears to be the same as the web window 130 of FIG. 1, but with the ability to operate outside of the first native browser window 120.

The user can now interact with the content in the new native browser window 340 in an identical fashion to when the content was in a web window. Transferring the content from the web window to the new native browser window 340 can involve either a) moving existing content to the new native browser window, or b) creating a copy of the content and removing the old content.

Preferably, the new native browser window 340 implements similar user interface features to the web window, so that the user is able to interact with both of the windows in the same way, i.e. to move, resize or close them. This is to avoid the user having to learn two different ways of interacting with native browser windows and web windows and ensure they have the same functionality. In practice, because the feature set of the native browser window is generally predefined, the web window is defined in such a way that it has the same, or similar, user interface to the native browser window feature set.

Figure 4:
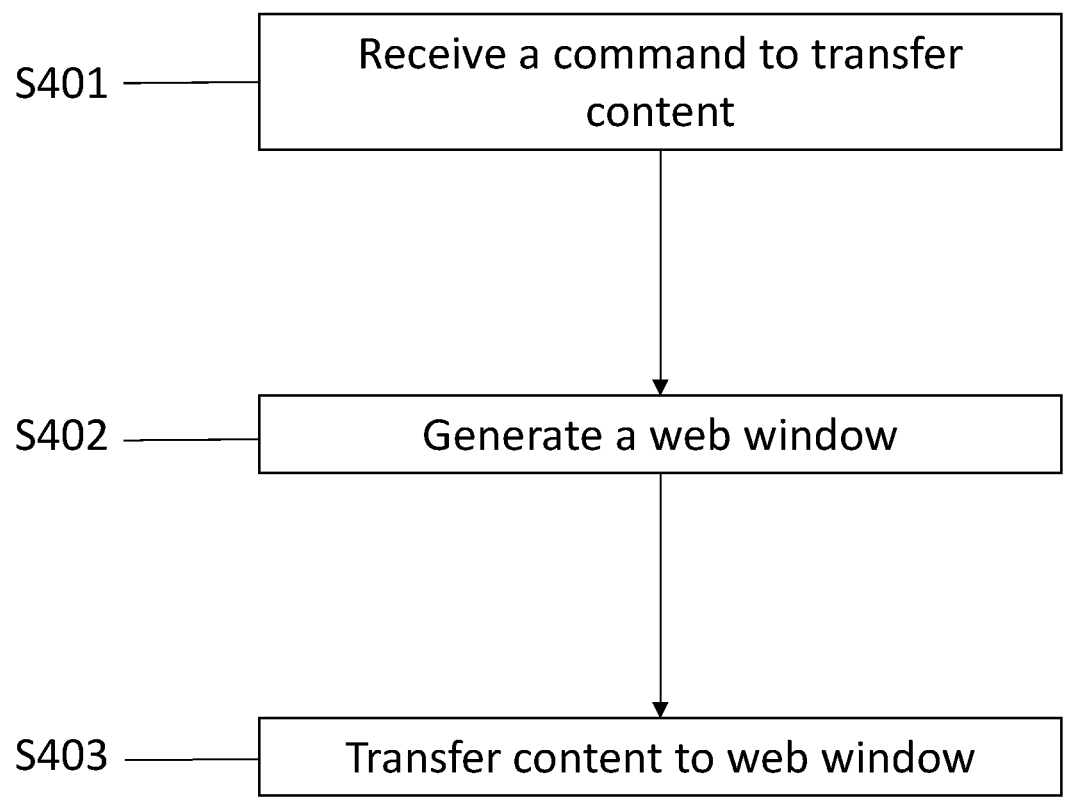
FIG. 4 is a flowchart of a window transfer method in accordance with one or more illustrative aspects described herein.

If required, the method above may be operated in reverse to transfer the content of the new native browser window 340 back into a web window displayed within the original native browser window 120. FIG. 4 illustrates an exemplary method for transferring the content of a native browser window back to a web window.

At step S401, a user issues a command to transfer the content of the new native browser window back to a web window. This command may take many different forms, including:

The user closing the new native browser window;
The user using a special button in the content area of the new native browser window;
The user using a dedicated keyboard shortcut;
The user moving an edge of the new native browser window back inside the original native browser window.

In response to receiving the command, at step S402, the application running the original native browser window, opens a new web window within the original native browser window. At step, S403, the application transfers the content of the new native browser window to the new web window.

Optionally, the native browser window may then be closed avoiding duplication of content.

The user can use the methods described by reference to FIGS. 2 and 3 to repeatedly transfer content between a web window and a native browser window as it suits their needs. The advantages of these methods include the following:

The application running within the native browser window is able to use space on the display screen outside of the native browser window;
The user is able to display content across multiple displays, if their computing system supports this;
The application running the native browser window does not need to request any special security permissions, such as asking the user to turn off their popup blocker, since the application can continue to work with web windows only;
The process of transferring content between web windows and native browser windows is intuitive and discoverable through means such as simply dragging a web window outside of the native browser window;
The process of opening a native browser window is done in response to a user command, which can avoid the new native browser window being blocked from opening by popup blockers (browsers use the user command to signify the user's intent, whereas if the page attempts to open a window when the user is idle then the browser may qualify that as a nuisance and block it)
A web window can look and work more like a native browser window with the same features, reducing the need to rewrite the application as a native operating system application.

The intent of these methods is for the user to be able to treat both web and native browser windows in the same manner without having to be concerned about whether it is the web application or the operating system that implements the window.

An illustrative content transfer method will now be described in more detail. This transfer method can apply to any kind of window, including both native browser windows and web windows as defined above. For simplicity, the following description will use as an example a web window configured as a "popup dialog" web window with a label and an "OK" button.

Whilst it is possible to transfer content to a new window by creating a copy of the content and then deleting the old content, it is preferable to simply move the existing content from the first window to the second window. This simplifies the implementation because the application transferring the content can preserve event handlers attached to the content, avoiding unnecessary duplication and processing.

For example, if the "OK" button of the web window has a "click" event handler, moving the button to a new native browser window will preserve the same "click" event handler and allow the button to continue operating as normal. However, if the "OK" button is copied rather than moved, then the "click" event handler will have to be added again as part of the transfer process if the "OK" button is to continue operating. If the content of a web window uses a lot of these event handlers this additional step adds a significant computational burden requiring a lot of additional code concerned with recreating event handlers. Moving content between windows avoids this problem.

Even when content is moved between windows, some event handlers will still need to be recreated. For example, some dialogs running in the content may listen for mouse move events. In some circumstances, this mouse move event is attached to the application's "document" or "window" object, which corresponds to the native browser window. Even if content is transferred by moving it, the mouse move event would still only fire when the mouse moves within the original native browser window, not the new native browser window, because that is still where the mouse move event is attached. In other words the event handler was added to an object outside of the new native browser window, and the object that is listening for the event was left behind. Any such events added to objects outside of the new native browser window must be removed and re-added for the content moved to the new native browser window. The code library that implements the transferring may simplify this by running "attach window events" and "detach window events" functions for the content. When transferring a web window to a native browser window, or vice versa, the library will run the "detach window events" function just before actually transferring the content area. After the transfer is done, it then runs the "attach window events" function. This provides the correct place for an event handler such as for window mouse movements to be removed and re-applied.

One advantage of moving content to a new window with the same event handlers is that the code continues to execute in the context of the original window. For example, if an "OK" button has a "click" event handler, and it is transferred to a new native browser window, the code associated with the "click" event still runs in the JAVASCRIPT context for the original native browser window. This is a useful feature as it allows all the application logic to be kept in the original native browser window, even when events happen in other windows. If this was not the case, it would be necessary to either copy the application state to the new native browser windows, or implement a special way of communicating between new native browser windows and the original native browser window. This would be significantly more complex. By using the original native browser window context for all logic the application is greatly simplified.

An illustrative method for moving content will now be further described with reference to the Document Object Model (DOM). The DOM tree is how HyperText Markup Language (HTML) documents are represented in JAVASCRIPT code. HTML is the standard markup language for creating both World Wide Web pages (web page) and web applications.

Figure 5:
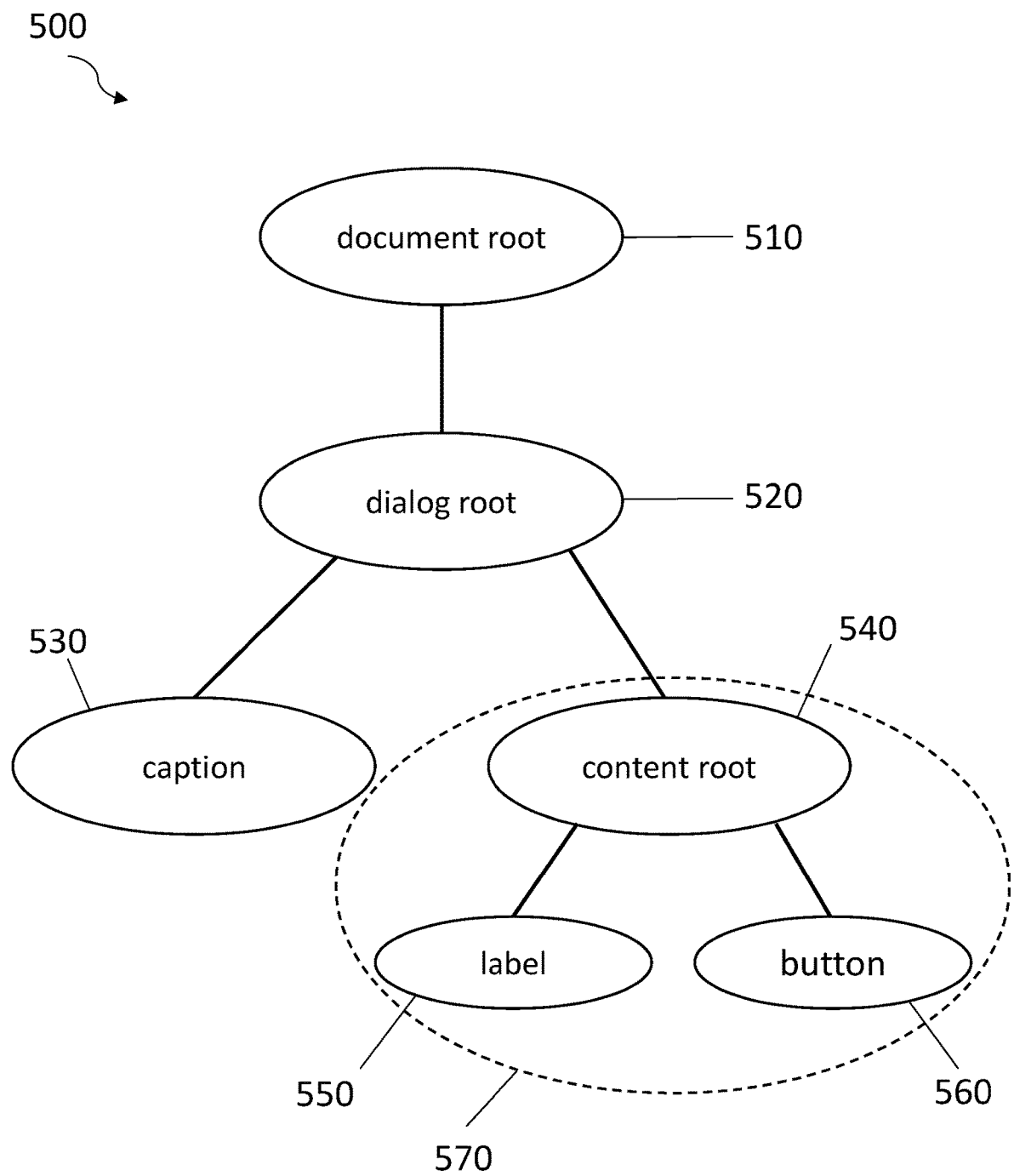
FIG. 5 is a DOM tree representation in accordance with one or more illustrative aspects described herein.

FIG. 5 illustrates a DOM tree 500 representing a simple dialog in a web browser displayed in a native browser window. DOM tree 500 comprises a document root node 510, the document root node is linked to a dialog root node 520. The dialog root node 520 comprises a caption node 530 and a content root node 540. The content root node 540 comprises a label node 550, and a button node 560. A web window would typically be represented as content sub-tree 570 within the DOM tree, as illustrated by the nodes circled with a dashed line in FIG. 5, nodes 540, 550 and 560. Therefore, FIG. 5 illustrates a simple HTML document which comprises a web window 570 which has both a label node 550 and a button node 560.

In FIG. 5, the dialog root node 520 may represent a dialog border, and the caption node 530 could show the title bar (possibly with other sub-elements (not shown) such as a close button). Since these elements are replicated by features in every native browser window, they should not be transferred to a new native browser window for the purposes of transferring content. Only the content root node 540 needs to be transferred to a new native browser window, and should be placed directly under the document root node in the DOM tree of the new native browser window. Moving content root node 540 will also bring the sub-nodes linked to it, label node 550 and button node 560, to the new DOM tree of the new native browser window. This is how only the content area is transferred to a new native browser window without any of the web window's caption, border or other UI features designed to mimic a native browser window. The new native browser window's features are the substitute for the nodes that are not transferred.

After transferring the content sub-tree 570 to the DOM tree of a new native browser window (nodes 540, 550 and 560), the dialog root node 520 and the caption node 530 are left behind, representing a dialog with no content. The dialog root node 520 and the caption node 530 may be destroyed and re-created as necessary, but it is preferable for simplicity to leave them behind hidden, so they do not appear to the user any more. This means that transferring the content of the new native browser window back to a web window simply involves moving the content root node 540 back to the same location under the dialog root node 520 in the original native browser window, and then showing the web window. This makes it straightforward to persist state such as the web window's last position and size in the original native browser window, since the elements and their associated position and style are preserved in a hidden state.

Figure 6A:
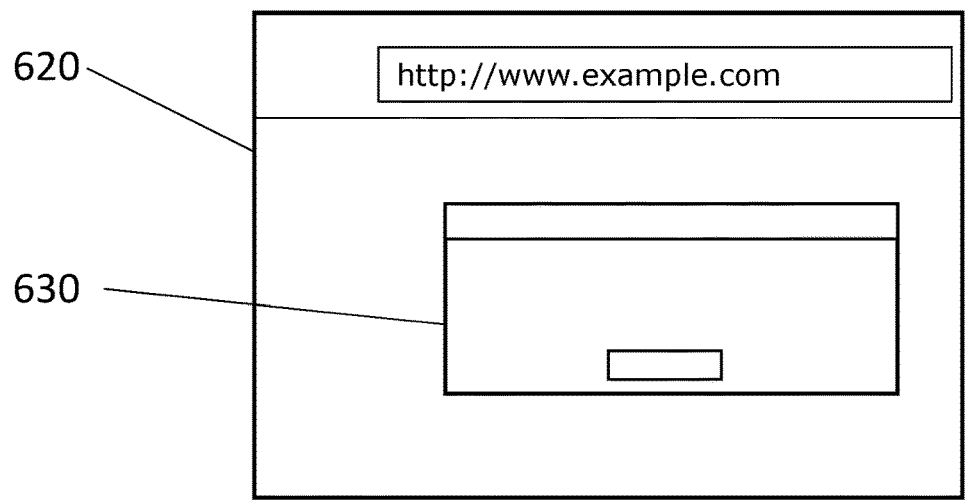
FIG. 6a is a representation of a native browser window in accordance with one or more illustrative aspects described herein.
Figure 6B:
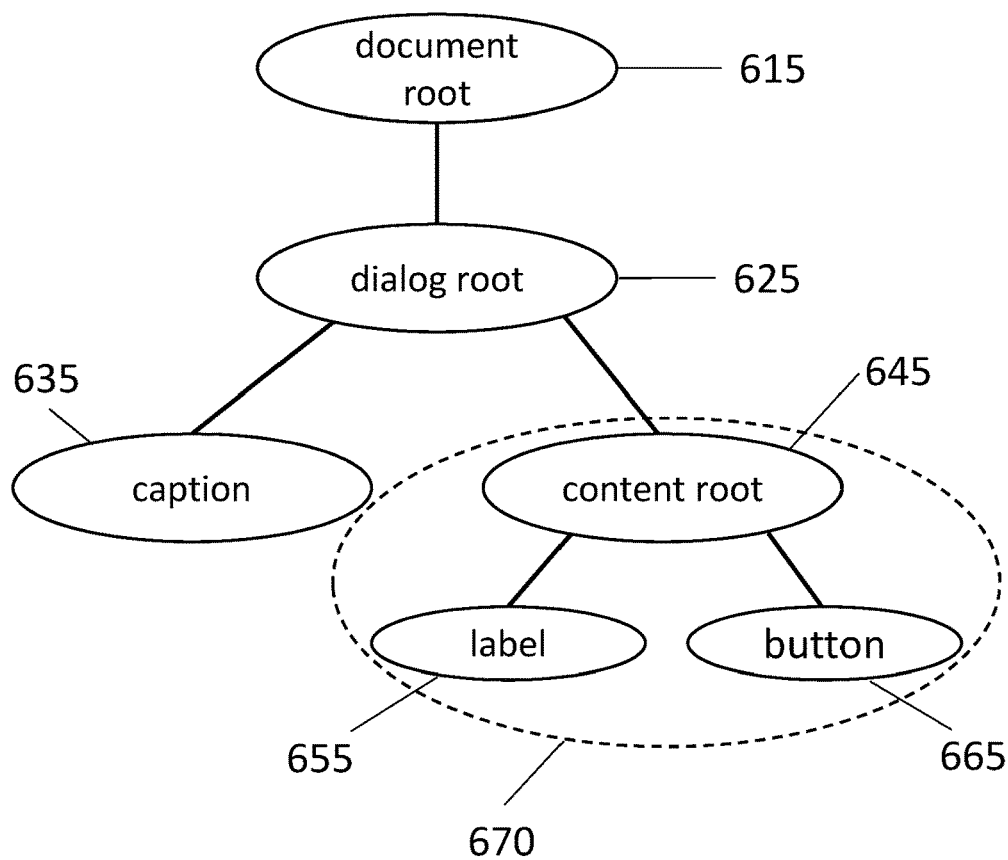
Figure 7A:
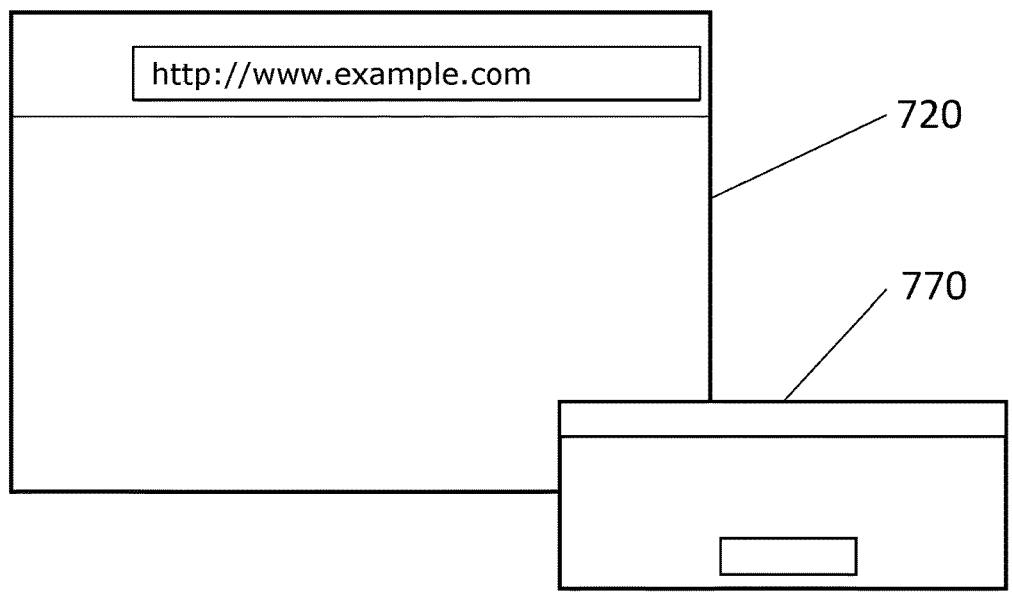
FIG. 7a is a representation of two native browser windows in accordance with one or more illustrative aspects described herein.
Figure 7B:
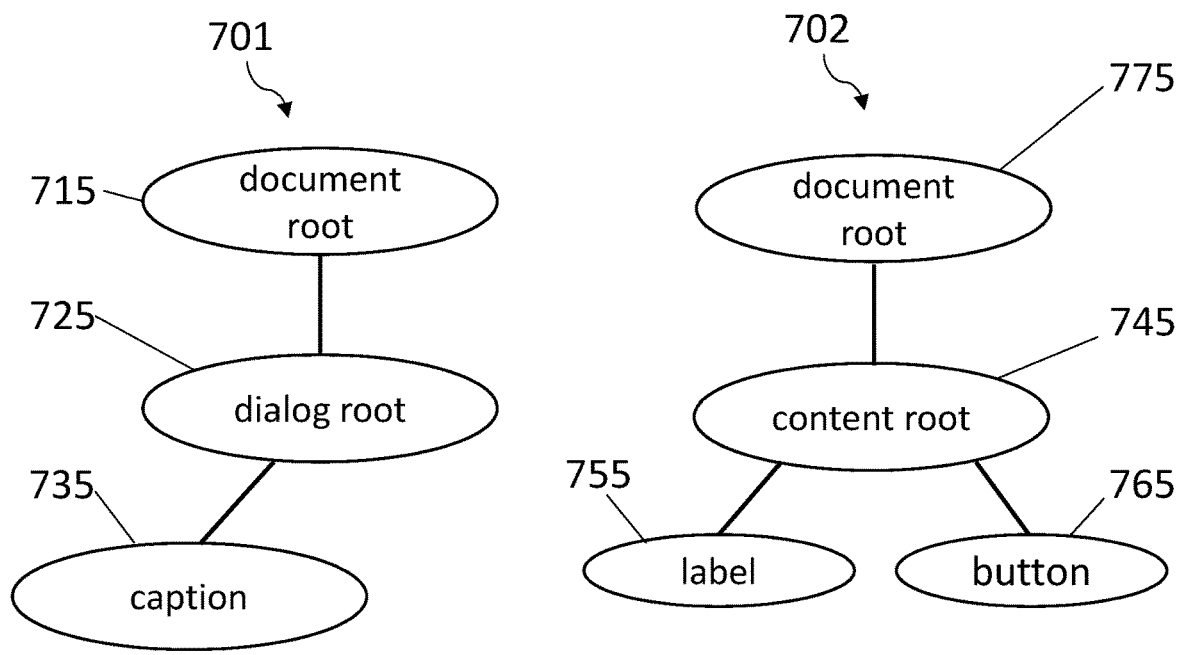

To illustrate the process of moving sub-trees, FIGS. 6a and 6b respectively illustrate the user interface and the corresponding DOM tree before transferring a web window, and FIGS. 7a and 7b respectively illustrate the user interface and the corresponding DOM trees after transferring the content of the web window to a new native browser window.

FIG. 6a illustrates a web window 630 displayed within a native browser window 620. FIG. 6b illustrates the corresponding DOM tree for the native browser window 620. The DOM tree comprises a document root node 615, the document root node is linked to a dialog root node 625. The dialog root node 625 comprises a caption node 635 and a content root node 645. The content root node 645 comprises a label node 655, and a button node 665. The web window 630 would typically be represented as content sub-tree 670 within the DOM tree, as illustrated by the nodes circled with a dashed line in FIG. 6b, nodes 645, 655 and 665.

FIG. 7a shows a native browser window 720 corresponding to the native browser window 620 of FIG. 6a. However, the web window 630 shown in FIG. 6a has now been replaced in FIG. 7a with a new native browser window 770. In this example, the second native browser window 770 has all of the same user interface features of the web window 630 shown in FIG. 6a, such as size, layout and functionality. Therefore, to the user, the second native browser window 770 appears to be the same as the web window 630 from FIG. 6a, yet can be treated as a native browser window.

FIG. 7b illustrates the remaining DOM tree 701 corresponding to the original native browser window 720 of FIG. 7a, after the sub-tree content branch relating to the new native browser window 770 has been moved. In order to avoid confusion to the user, in use, dialog root node 725 and caption node 735 will be hidden, thereby removing the un-used user interface features from view.

FIG. 7b also shows a second DOM tree 702 corresponding to the new native browser window 770. The second DOM tree 702 comprises a content root node 745 which has been linked to the document root note of the new native browser window 770. The content root node 745 comprises a label node 755 and a button node 765.

The following modifications were made between the illustrations shown in FIGS. 6 and 7:
A new native browser window 770 was created;
The content root sub-tree (corresponding to nodes 645, 655 and 665) of the native browser window 620 DOM tree was moved to the DOM tree 702 of the new native browser window 770;
The dialog root node 725 and the caption node 735 remaining in the native browser window 720 are hidden.

As set out previously, when content is transferred to a new native browser window, the code associated with event handlers still runs in the Javascript® context for the original native browser window. Thus, when DOM sub-trees are transferred to a new native browser window, event handlers that are linked to moved nodes (such as for a "click" event handler linked to button node 665/765) still execute in the original native browser window.

Other event handlers which are not linked to nodes moved between DOM trees, whose function it is wished to be preserved in the new native browser window, must be explicitly removed from the original native browser window, and added again for the new native browser window.

An example of this kind of event handler is a "mousemove" event handler linked to the document root node 615 of the original DOM sub-tree. The code library implementing the sub-tree transfer can help removing and re-adding these type of event handlers. In this case, the actual event handler logic for the "mousemove" event still executes in the original native browser window 720 JAVASCRIPT context.

The JAVASCRIPT context of the new native browser window 770 is not directly used by any of the discussed event handlers, nor is it used for any application state or logic. It may however have logic to communicate with the original native browser window 720 to help facilitate the transfer of content, such as notifying the original native browser window 720 when it has successfully opened and is ready to accept DOM nodes. Note that adding external event handlers like "mousemove" is still done from the original native browser window 720 JAVASCRIPT context, since it has full access to the new native browser window 770. The new native browser window's 770 JAVASCRIPT context is not used even to reattach event handlers.

Transferring the content of the new native browser window 770 back to a web window may be performed by reversing the process set out above. That is:
- the content root node 745 is transferred back to the original native browser window dialog root node 725;
- the dialog root node 725 is displayed again;
- external event handlers like "mousemove" are detached from the DOM tree of the new native browser window 702 and reattached to the original native browser window DOM tree 701; and
- the new native browser window 770 is closed.

Additional factors such as "style information" may be associated with native browser windows and web windows. Typically these are provided by style sheets (CSS). If the native browser window uses style sheets that affect the appearance of the transferred content area, then these same styles must also be available in the new native browser window to preserve the same appearance. Style sheets should not be moved since the original native browser window is still likely to need them. In cases such as these, it is preferable to load all of the same style sheets the original native browser window uses into any new native browser windows that are opened. This ensures that any content moved to a new native browser window will continue to have the same appearance to the user as it did in the original native browser window. The application preferably waits until the new native browser window has finished loading these style sheets before transferring the content to it, otherwise the content could briefly appear without the intended styles.

Figure 8:
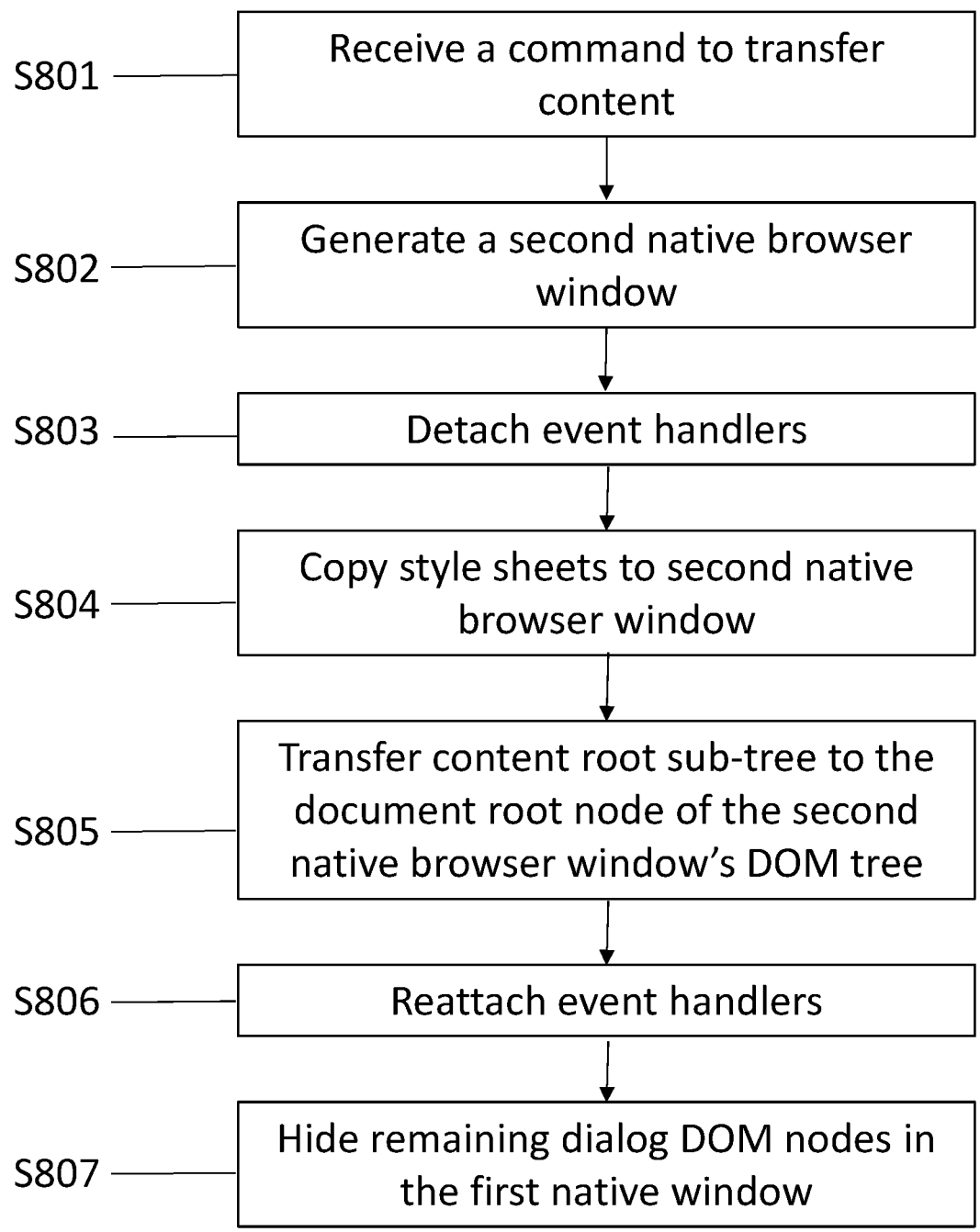
FIG. 8 is a flowchart of a window transfer method in accordance with one or more illustrative aspects described herein.

FIG. 8 illustrates an illustrative method in accordance with the present invention, with reference to the above described DOM tree objects. At step S801 a user issues a command to transfer a web window to a native browser window. This command may take many different forms, including those set out above in relation to step S201.

In response to receiving the command, at step S802, the application running the native browser window, opens a second native browser window, outside of the original native browser window. This is possible using browser APIs designed for the purpose (e.g., window.open( ) in JAVASCRIPT).

At step S803, the application detaches any event handlers which are not linked to nodes to be moved between DOM trees, whose function it is wished to be preserved in the second native browser window.

At step S804, any style sheets associated with the web window are copied to the second native browser window.

At step S805 the content root sub-tree is transferred, by the application, to the document root node of the second native browser window's DOM tree.

At step S806, the event handlers which were detached at step S803 are reattached to the relevant nodes of the second native browser window's DOM tree.

At step S807, the remaining DOM nodes in the original native window are hidden.

Figure 9:
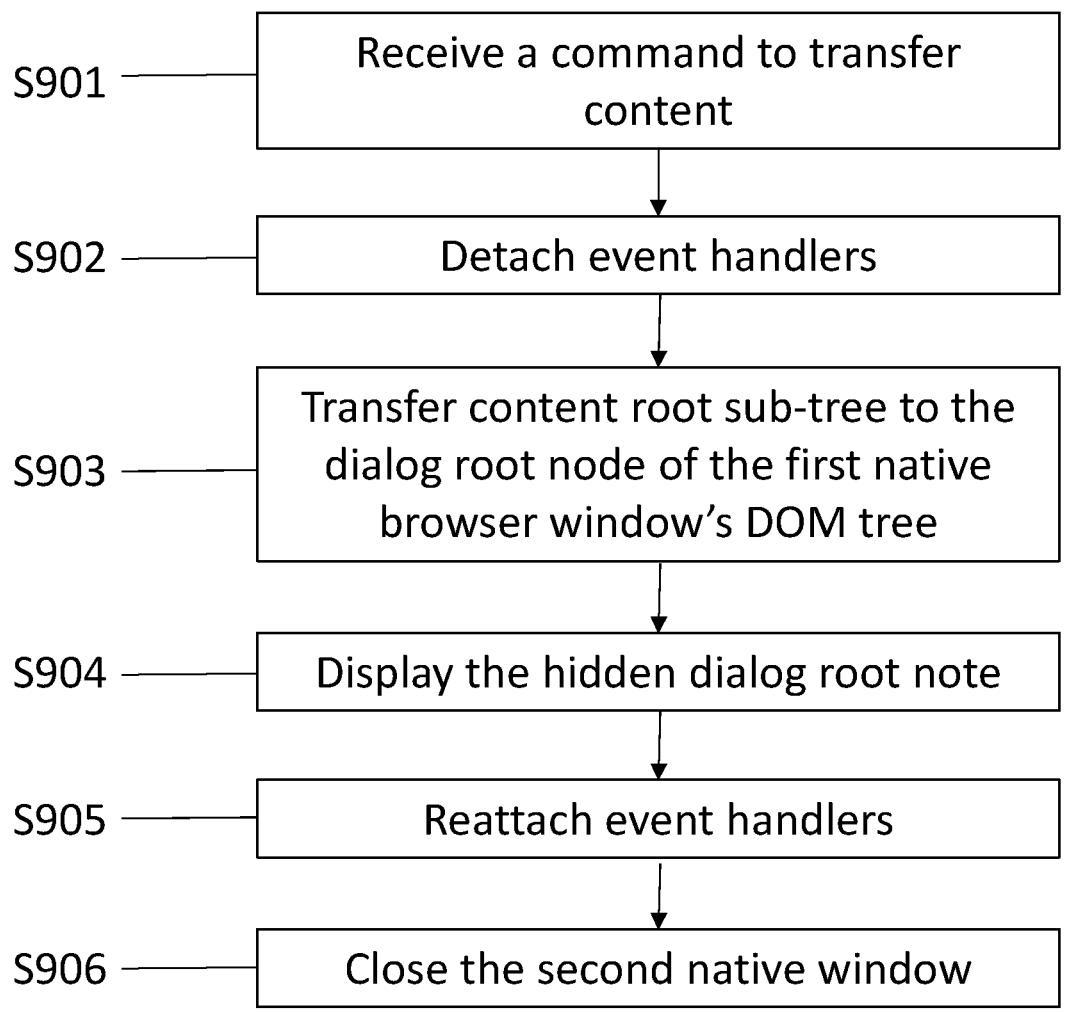
FIG. 9 is a flowchart of a window transfer method in accordance with one or more illustrative aspects described herein.

FIG. 9 illustrates an illustrative method for reversing the process shown in FIG. 8, with reference to the above described DOM tree objects. At step S901 a user issues a command to transfer the content of the new (second) native browser window back to a web window. This command may take many different forms, including those set out above in relation to step S401.

At step S901, the application detaches any event handlers which are not linked to nodes to be moved between DOM trees, whose function it is wished to be preserved in the new web window.

At step S903 the content root sub-tree is transferred, by the application, to the dialog root node of the first native browser window's DOM tree.

At step S904 the previously hidden dialog root node (see S807 of FIG. 8) is re-displayed, causing a new web window to appear.

At step S905 the event handlers which were detached at step S902 are reattached to the relevant nodes of the first native browser window's DOM tree.

Finally, at step S906 the second native window is closed.

In summary, when transferring content from a web window to a new native browser window, preferably the only newly created object is the new native browser window itself. Existing content is then moved to it from the web window, and existing event handlers are used and continue to execute in the original native browser window JAVASCRIPT context (the logic for these event handlers is never moved). Some external event handlers like "mousemove" that operate at the document or window level may need to be transferred also, by detaching the event handlers and reattaching the event handlers to the new native browser window DOM tree as appropriate. However, the overall approach is intended to require the minimum number of changes to the software to support transferring content to new native browser windows. This helps simplify the architecture and development of software using this invention.

A benefit of the above-described method is that a user may treat web windows and native browser windows in the same manner. The user does not have to be concerned about whether it is the web page or the operating system that implements the window. The transfer of the content of web windows to native browser windows allows the user to use screen area outside the main browser window. This includes moving the new native window to different displays, if their system has multiple display units. This helps a sophisticated web application achieve similar features and flexibility for the user as a native application.

Figure 10:
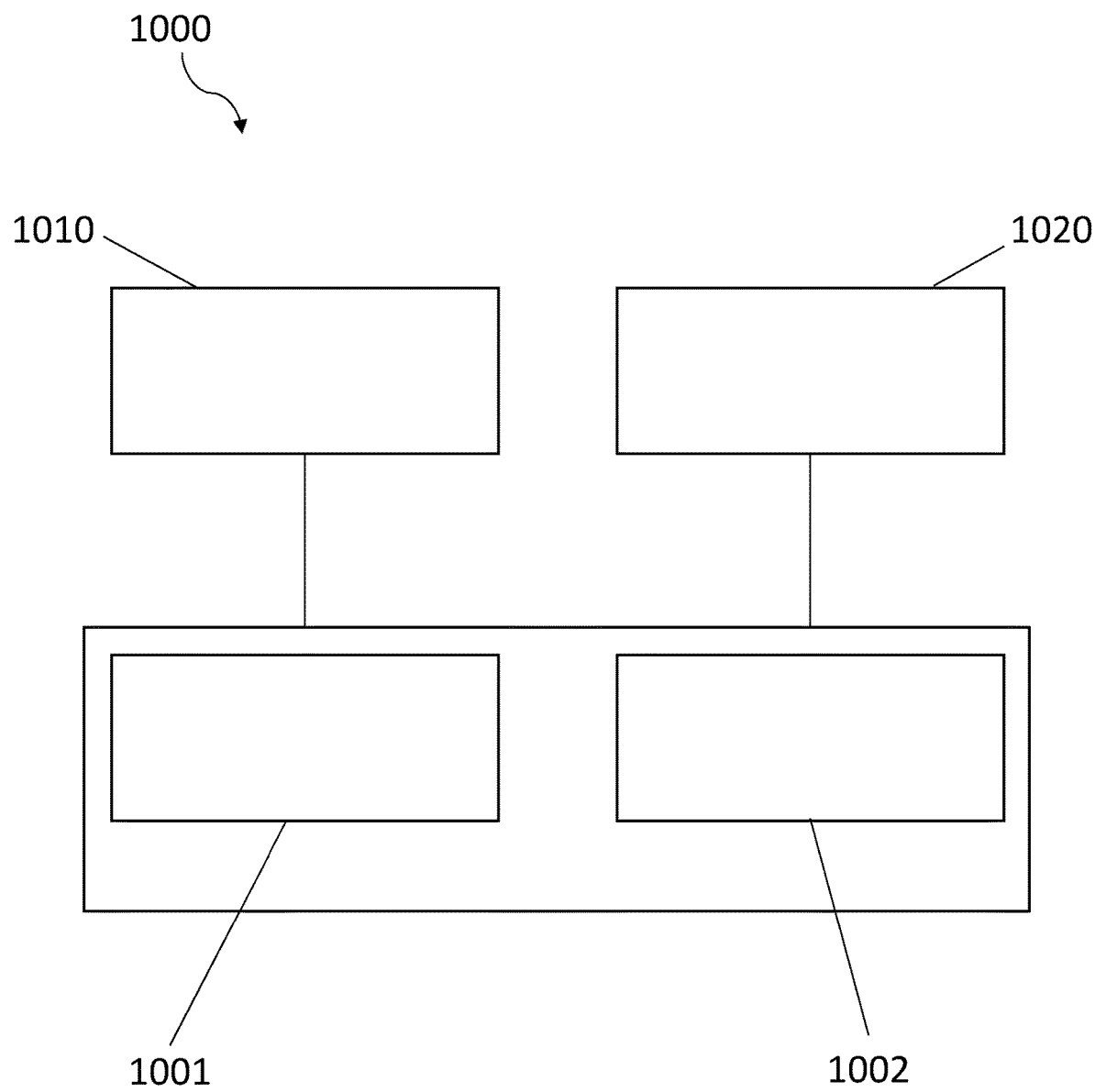
FIG. 10 is a system diagram in accordance with one or more illustrative aspects described herein.

FIG. 10 shows an illustrative system that may be used to implement one or more aspects described herein. A computing device 1000 comprises a processor 1001, and a non-volatile memory 1002. Processor 1001 may comprise one or more individual processor cores. The computing device 1000 further comprises a display 1010 and a user interface 1020. The computing device 1000 may be a desktop computer, laptop or tablet device or smartphone or other computing device. In some examples the display 1010 will be integrated into the computing device 1000. The user interface 1020 may be a keyboard and/or mouse arrangement, or may utilise a touch screen where appropriate. The computing device 1000 also comprises an operating system (not shown). The methods described herein may run on the operating system (not shown) of computing device 1000.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

The above embodiments describe one way of implementing the present invention. It will be appreciated that modifications of the features of the above embodiments are possible within the scope of the independent claims. For example, the methods described herein may be applied to any kind of window. The features of the browser windows and web windows described herein are for example only and should not be seen as limiting to the claimed invention.

Features of the present invention are defined in the appended claims. While particular combinations of features have been presented in the claims, it will be appreciated that other combinations, such as those provided above, may be used.

The invention claimed is:

1. A method comprising:
executing by a web page retrieved by a browser application, a web window system providing one or more web windows within a first native browser window rendering the web page;
displaying a web window with first content within the confines of the first native browser window of the browser application displayed within a graphical user interface, wherein the first native browser window further comprises second content outside the web window within the confines of the web page within the first native browser window of the browser application displayed within the graphical user interface;
receiving a command to transfer the first content of the web window to a second native browser window within the graphical user interface;
generating, by a second window system executed by an operating system on which the first native browser window is executing, the second native browser window; and
transferring, from the web window system to the second window system executed by the operating system, the first content of the web window for display in the second native browser window.

2. The method of claim 1, wherein the second native browser window is generated in response to receipt of the command to transfer the web window.

3. The method of claim 1, wherein the command to transfer the web window comprises one or more of:
a) moving, based on user input, a part of the web window outside of an edge of the first native browser window;
b) selecting, based on user input, a transfer object displayed in the web window;
c) receiving a command from a web page displayed in the first native browser window;
d) receiving an input from an input device connected to a computer system on which the browser application is running.

4. The method of claim 1, wherein the first content of the web window is represented by a document model sub-tree, and the step of transferring the first content comprises moving the sub-tree from a document model tree of the first native browser window to a document model tree of the second native browser window.

5. The method of claim 4, wherein the document model tree is a Document Object Model (DOM) tree, the sub-tree is a content sub-tree, and the step of transferring the first content of the web window to the second native browser window comprises:
moving the content sub-tree of the DOM tree of the first native browser window to the DOM tree of the second native browser window.

6. The method of claim 5, wherein the window content transfer method further comprises:
detaching one or more event handlers from the DOM tree of the first native browser window; and
attaching the one or more event handlers to the DOM tree of the second native browser window.

7. The method of claim 1, wherein the window content transfer method further comprises copying one or more style sheets from the first native browser window to the second native browser window.

8. The method of claim 1, wherein one or more of the following apply:
the second native browser window is displayed in a same position as the web window;
the second native browser window is a same size as the web window;
the web window comprises a caption and the second native browser window has a same caption as the web window;
the first native browser window is run in accordance with one or more style sheets and the second native browser window is run in accordance with the same style sheets as the first native browser window; and
the second native browser window has the same user interface features as the web window.

9. The method of claim 8, wherein the same style sheets as the first native browser window define a same set of style definitions as the one or more style sheets.

10. The method of claim 1, wherein the step of closing the web window is performed once the first content of the web window has been transferred to the second native browser window.

11. The method of claim 10, wherein the step of closing the web window comprises:
hiding the nodes of the DOM tree responsible for displaying the web window in the first native browser window.

12. The method of claim 1, further comprising:
receiving a command to close the second native browser window;
generating, by the web window system, a second web window within the first native browser window; and
transferring from the second window system to the web window system, the content displayed in the second native browser window to the second web window.

13. The method of claim 12, wherein the command to transfer the second native browser window to the second web window comprises one or more of:
   a) moving, by a user, a part of the second native browser window inside of an edge of the first native browser window;
   b) selecting, by a user, a transfer object displayed in the second native browser window;
   c) receiving an input from an input device connected to the system on which the browser application is running.

14. The method of claim 12, wherein the content of the second native browser window is represented by a document model sub-tree, and the step of transferring the content comprises moving the sub-tree from a document model tree of the second native browser window to a document model tree of the first native browser window.

15. The method of claim 14, wherein the document model tree is a Document Object Model (DOM) tree, the sub-tree is a content sub-tree, the step of transferring the content of the second native browser window to the second web window comprises:
   moving the content sub-tree of the DOM tree of the second native browser window to the DOM tree of the first native browser window.

16. The method of claim 15, wherein the step of generating the second web window comprises:
   un-hiding the nodes of the DOM tree responsible for displaying the web window in the first native browser window.

17. The method of any of claim 12, further comprising:
   closing the second native browser window once its content has been transferred to the second web window.

18. The method of claim 1, wherein one or more background processes of the second native browser window continues to execute in the first native browser window.

19. One or more non-transitory computer readable media storing computer readable instructions which, when executed, cause a system to perform a method of transferring content by:
   executing by a web page retrieved by a browser application, a web window system providing one or more web windows within a first native browser window rendering the web page;
   displaying a web window with first content within the confines of the first native browser window of the browser application displayed within a graphical user interface, wherein the first native browser window further comprises second content outside the web window within the confines of the web page within the first native browser window of the browser application displayed within the graphical user interface;
   receiving a command to transfer the first content of the web window to a second native browser window within the graphical user interface;
   generating, by a second window system executed by an operating system on which the first native browser window is executing, the second native browser window; and
   transferring, from the web window system to the second window system executed by the operating system, the first content of the web window for display in the second native browser window.

20. A system, comprising:
a processor; and
memory storing computer readable instructions which, when executed, cause the system to perform a method of transferring content by:
executing by a web page retrieved by a browser application, a web window system providing one or more web windows within a first native browser window rendering the web page;
displaying a web window with first content within the confines of the first native browser window of the browser application displayed within a graphical user interface, wherein the first native browser window further comprises second content outside the web window within the confines of the web page within the first native browser window of the browser application displayed within the graphical user interface;
receiving a command to transfer the first content of the web window to a second native browser window within the graphical user interface;
generating, by a second window system executed by an operating system on which the first native browser window is executing, the second native browser window;
transferring, from the web window system to the second window system executed by the operating system, the first content of the web window for display in the second native browser window.

* * * * *